(12) United States Patent
Chao (10) Patent No.: US 8,769,274 B2
(45) Date of Patent: Jul. 1, 2014

(54) BACKUP AND RESTORE IN A SECURE APPLIANCE WITH INTEGRITY AND CONFIDENTIALITY

(75) Inventor: Ching-Yun Chao, Raleigh, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/604,427

(22) Filed: Sep. 5, 2012

(65) Prior Publication Data

US 2014/0068258 A1    Mar. 6, 2014

(51) Int. Cl.
   *H04L 29/06*    (2006.01)
(52) U.S. Cl.
   USPC .......................................... 713/167; 380/286
(58) Field of Classification Search
   USPC .......................................... 713/167; 380/286
   See application file for complete search history.

(56) References Cited

U.S. PATENT DOCUMENTS

| | | | |
|---|---|---|---|
| 6,574,733 B1 * | 6/2003 | Langford | 713/193 |
| 6,754,827 B1 * | 6/2004 | Cane et al. | 713/193 |
| 8,429,425 B2 * | 4/2013 | Ko et al. | 713/193 |
| 2005/0228994 A1 | 10/2005 | Kasai et al. | |
| 2008/0226082 A1 * | 9/2008 | Brunet et al. | 380/277 |
| 2008/0307020 A1 | 12/2008 | Ko et al. | |
| 2009/0031145 A1 | 1/2009 | Nishiyama | |
| 2009/0052669 A1 * | 2/2009 | Ma | 380/277 |
| 2010/0162002 A1 * | 6/2010 | Dodgson et al. | 713/193 |
| 2012/0079284 A1 | 3/2012 | Takatani | |

FOREIGN PATENT DOCUMENTS

| | | |
|---|---|---|
| EP | 1300746 | 6/2001 |
| JP | 20070200065 | 7/2005 |

OTHER PUBLICATIONS ip.com: "Cryptographic Facility Key Storage Backup and Restore Procedure", Matyas SM, et al.; Jan. 29, 2005.
ip.com: "Transparent EFS-Keystore Management on Backup and Restore of EFS Files", IBM; Oct. 18, 2007.
IBM Websphere: "Virtualization with IBM Workload Deployer: Designing and Deploying Virtual Systems", Hakim, et al, Nov. 2011.

* cited by examiner

*Primary Examiner* — Matthew Smithers
(74) *Attorney, Agent, or Firm* — Jeffrey S. LaBaw; David H. Judson (57) ABSTRACT

A cloud deployment appliance includes a key stored internally and that is used during restore to decrypt encrypted backup images. That key is not available to an administrator of the appliance; instead, the administrator receives a "value" that has been generated externally to the appliance and, in particular, by applying a public key of a public key pair to the key. The value is possessed by the administrator, but it does not expose the key. Upon a given occurrence, such as a disk failure in the appliance, the administrator uses the value to obtain" the key, which is then used to restore an encrypted backup image. The key is obtained by having the administrator provide the value to an entity, e.g., the appliance manufacturer, who then recovers the key for the administrator (by applying the private key of the public key pair).

16 Claims, 6 Drawing Sheets

BACKUP AND RESTORE IN A SECURE APPLIANCE WITH INTEGRITY AND CONFIDENTIALITY

BACKGROUND OF THE INVENTION

1. Technical Field

This disclosure relates generally to backup and restore of sensitive data stored in a cloud deployment appliance.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run networked applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known in the art to provide an appliance-based solution to facilitate rapid adoption and deployment of cloud-based offerings. One such appliance is IBM® Workload Deployer, which is based on the IBM DataPower® 7199/9005 product family. Typically, the appliance is positioned directly between the business workloads that many organizations use and the underlying cloud infrastructure and platform components. Because of this unique position, the appliance can receive and act upon operational data, and it can monitor application workload demand conditions and adjust resource allocation or prioritization as required to achieve established service level agreements. IBM Workload Deployer also may be used to manage a shared, multi-tenant environment, where isolation and security are important.

Typically, the appliance includes hardware and firmware cryptographic support to encrypt all the data on hard disk. This data includes, without limitation, event log data that may be used to facilitate auditing. No users, including administrative users, however, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance. Currently, this decryption key is maintained and managed by an administrator so that the administrator can restore the backup image to a new appliance box should the original appliance box fail completely and need to be replaced. This approach of having the administrator maintain the decryption key used for restore, however, places the data at risk because the administrator can use that key to decrypt the backup image outside of the appliance and thus gain access to all sensitive user data.

The subject matter herein addresses the security risk.

BRIEF SUMMARY

According to this disclosure, a cloud deployment appliance includes a key stored internally and that is used during restore to decrypt encrypted backup images. That key, however, preferably is not available to an administrator of the appliance; instead, the administrator receives a "value" that has been generated externally to the appliance and, in particular, by applying to the key a public key of a public key pair. The value is possessed by the administrator but it does not expose the key, and the value can be used to restore a backed-up image in the event of disk failure or system failure.

In particular, upon a given occurrence, such as a disk failure in the appliance, the administrator uses the value to enable another entity, e.g., the appliance manufacturer, to "restore" the key in a replacement appliance, which can then be used to restore an encrypted backup image. In particular, the key is "restored" by having the administrator provide the value to the entity, who then recovers the key for the administrator (by applying the private key of the public key pair). The manufacturer then installs the key (that it has recovered from the value) in a new appliance, which new appliance is then provided to the administrator. The administrator can then recover the encrypted backup image automatically by simply executing the new appliance's backup and restore utility, which utility uses the key that has been installed in the new appliance. In the event of a recoverable disk failure, it may not be necessary for the manufacturer to provide an entirely new appliance; in such case, the manufacturer may simply provide the administrator the key (that has been recovered from the value) so that the restore can be carried out on the original appliance. In either case, once the restore is completed, a new key is generated and stored in the appliance to replace the original decryption key. The public key is applied to the new key to generate a new value, which new value may then be provided to the administrator (and, optionally, the manufacturer).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
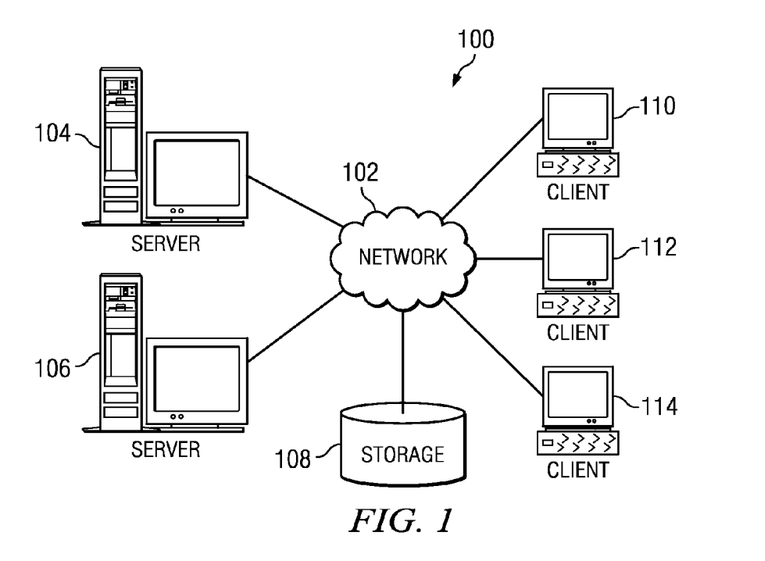
FIG. 1 depicts an exemplary block diagram of a distributed data processing environment in which exemplary aspects of the illustrative embodiments may be implemented.
Figure 2:
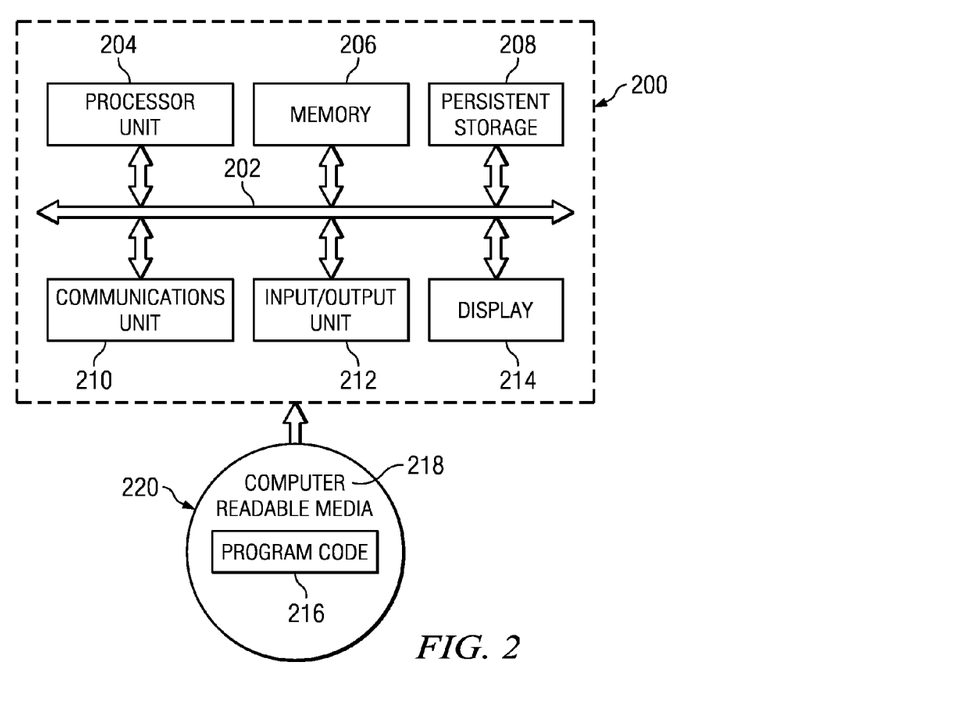
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
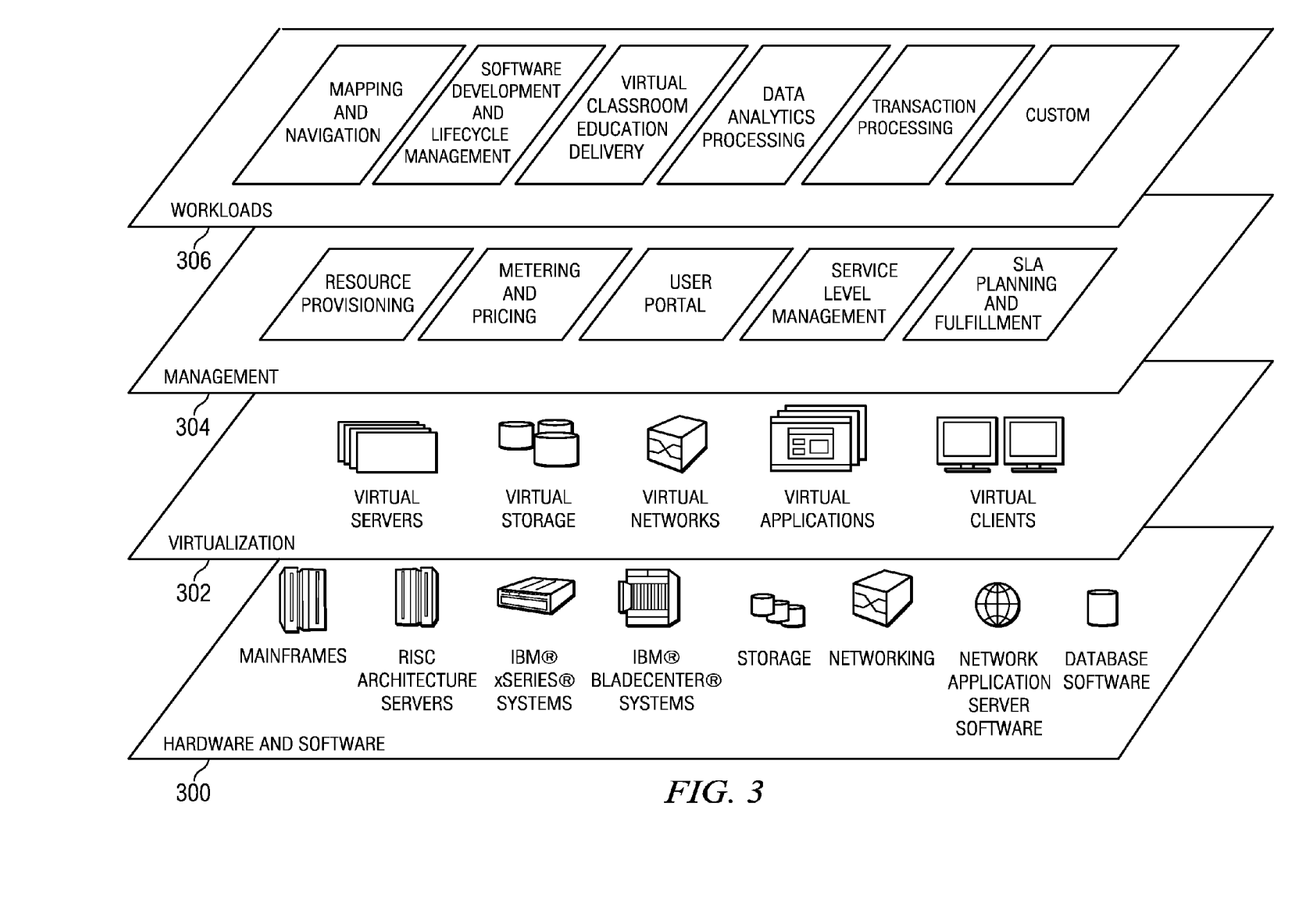
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Cloud Deployment Technologies

It is known to provide an appliance-based solution to facilitate rapid adoption and deployment of both Infrastructure and Platform as Service offerings. As described above, one such appliance is IBM Workload Deployer, and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
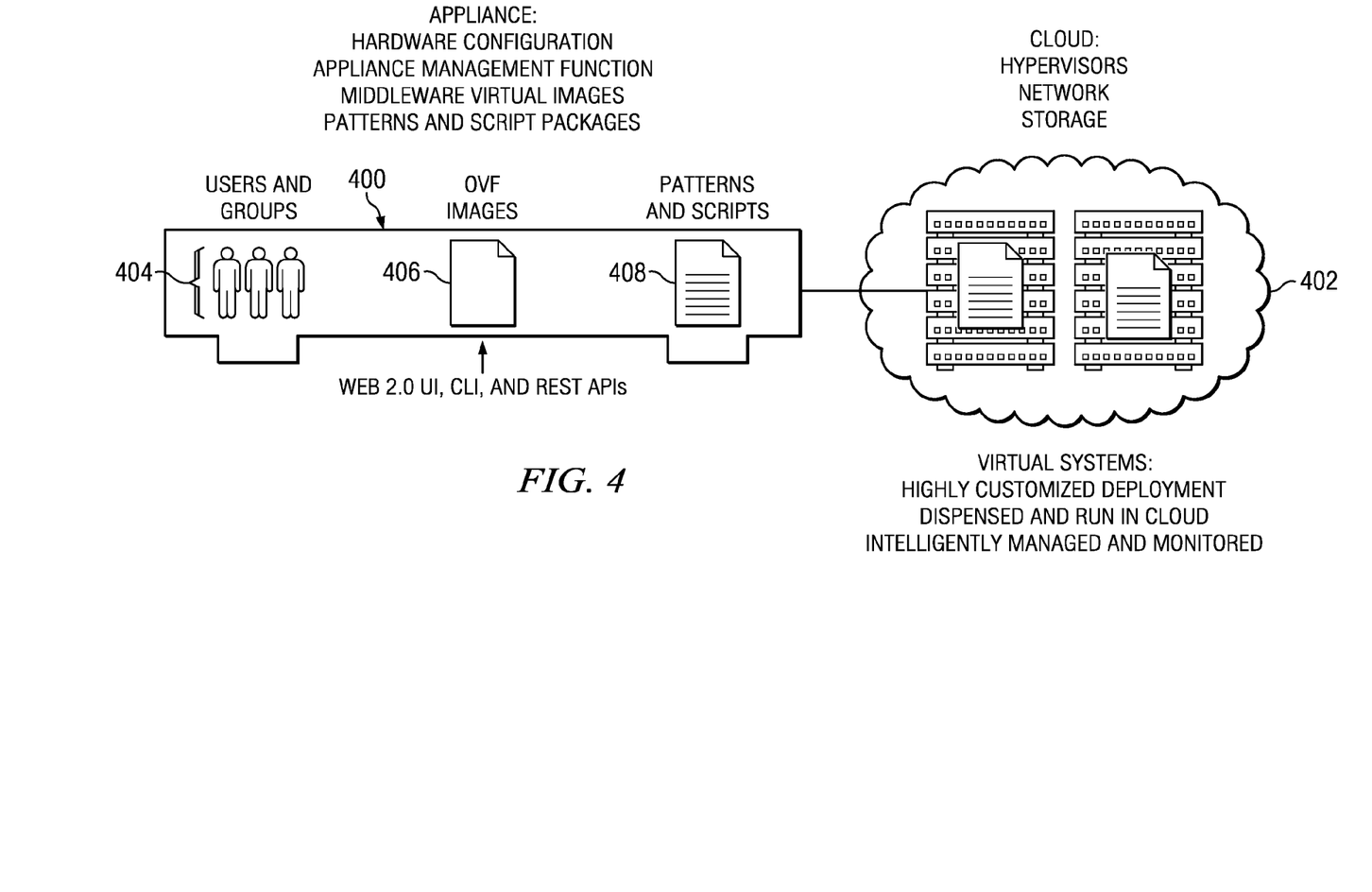
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. The management function and interfaces provide a template-based approach to construction that permits the rapid creation and modification of an otherwise complex set of hardware and software components. In particular, the use of patterns allows an organization to construct an individual element or integrated solution one time, and then to dispense the final product on demand. Typically, there are two types of patterns: virtual system patterns provide the most flexibility and customization options of the two types. It consists of an operating system and, potentially, additional software solutions, such as WebSphere® Application Server. Virtual application patterns are optimized and are constructed typically for the purpose of supporting a singular workload.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

Figure 5:
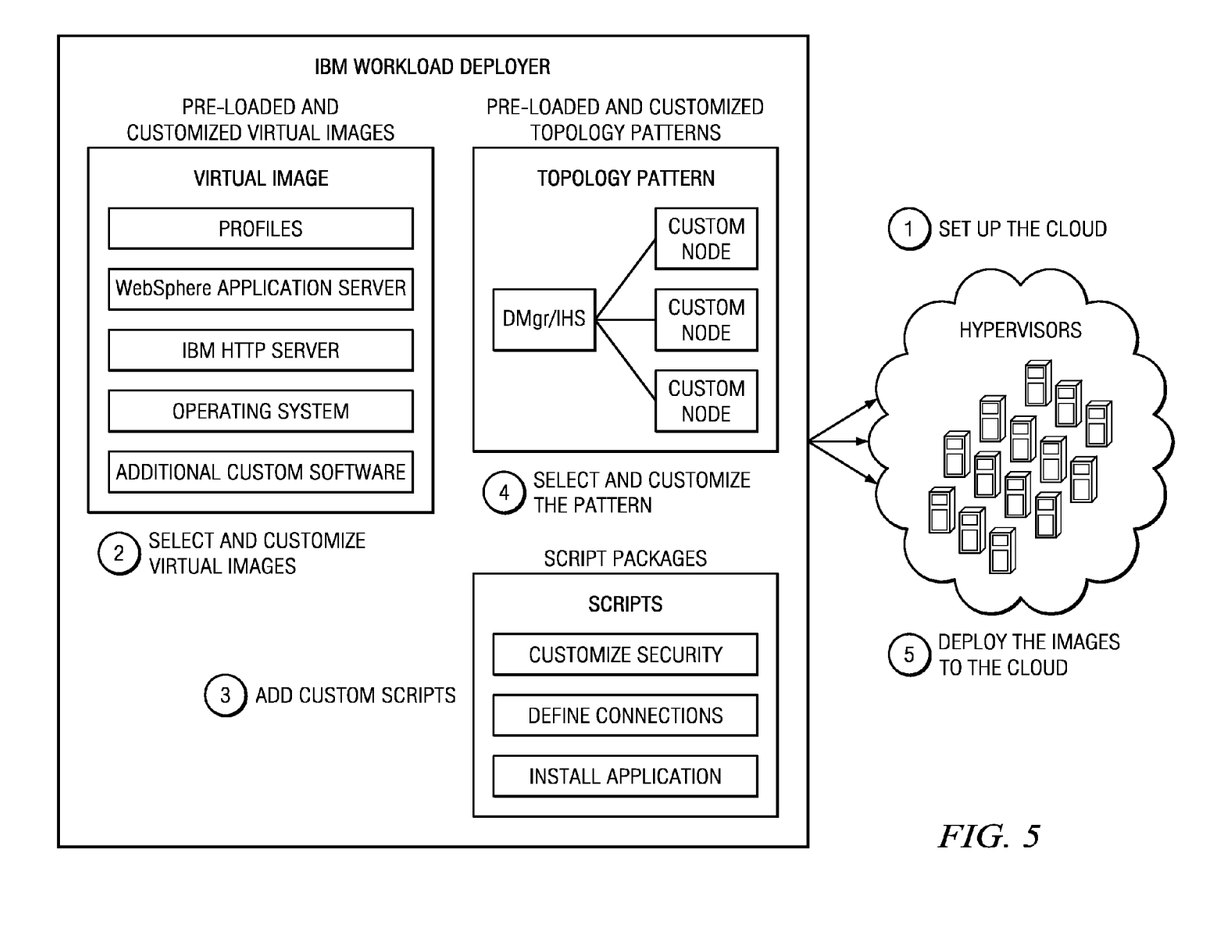
FIG. 5 illustrative representative functional components of the network-based appliance.

FIG. 5 illustrates how the appliance can be used to build a custom private cloud. At step 1, the hardware, hypervisors and networking for the cloud are identified. At step 2, the user selects and customizes the virtual images. At step 3, the user adds one or more script packages as needed to customize the deployed middleware environment. At step 4, pre-installed or customized patterns are used to describe the middleware topology to be deployed. Patterns can be built from virtual images, e.g. using a drag-and-drop interface. At step 5, the virtual systems are deployed to the cloud.

The references herein to IBM Workload Deployer are exemplary and should not be taken to limit the disclosed technique, which may be implemented on any appliance (or, more generally, machine) having the general characteristics and operating functionality that has been described.

Backup and Restore with Integrity and Confidentiality Protection

With the above as background, the subject matter of this disclosure is now described. Without limitation, the subject matter may be implemented within or in association with a cloud deployment appliance as has been described. According to this disclosure, a mechanism is provided to enable permitted users (e.g., customer IT administrators) to backup and restore data from an internal data store of the appliance to a data store of another such appliance in the event of an unrecoverable failure of the first appliance.

Figure 6:
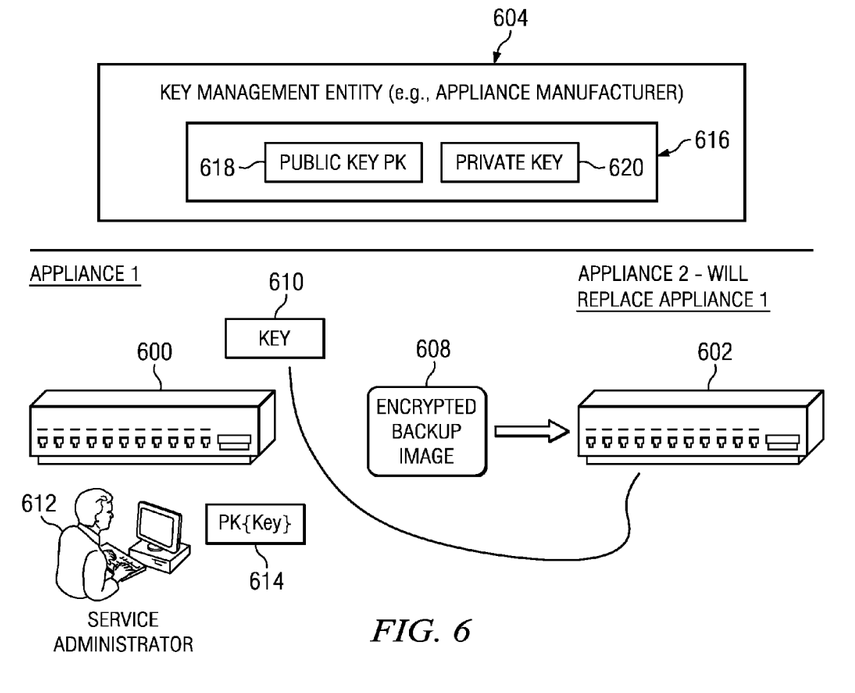
FIG. 6 illustrates an operating scenario in which an administrator desires to restore an encrypted backup image, originally generated in a first appliance, to a replacement appliance.

FIG. 6 illustrates an operating scenario in which an administrator 612 desires to restore an encrypted backup image 608, originally generated in a first appliance 600, to a replacement appliance 602. Each of the appliances 600 and 602 is a secure appliance in the sense that the box includes cryptographic support (e.g., in both hardware and firmware, and possibly software) to encrypt all the data in the device on (internal) physical disk. As has been described, given the physical security features implemented in the appliance box, no users, including administrative users, can access any data on that physical disk. In particular, preferably the appliance operating system (e.g., Linux) locks down the root account and does not provide a command shell, and the user does not have file system access. Because the data on the disk is sensitive and important for auditing and other purposes, the appliance also includes a backup utility that generates periodic backup(s) of the data (including file system snapshots, event logs, and the like) that are then encrypted with a key 610. Each periodic backup is sometimes referred to herein as an "encrypted backup image." The appliance also provides an interface (e.g., a Web-based UI, a CLI, or a REST-based API) through which an administrator can manually or programmatically initiate a restore of encrypted backup image. When restoring an encrypted image, a decryption key thus is needed to decrypt the backup image to enable the data to be restored to the appliance.

As is well-known, in cryptography, a key is a piece of information that determines the output of a cryptographic algorithm (or cipher). In encryption, a key specifies a particular transformation of plaintext into ciphertext; in decryption, a key specifies a particular transformation of ciphertext into plaintext. When the cryptographic algorithm is "symmetric," the key used for encryption may be the same key used for decryption; when the cryptographic algorithm is "asymmetric," the key used for encryption is different from the key used for decryption, although the encryption and decryption keys are related to one another mathematically. A well-known cryptosystem scheme that uses asymmetric keys is a public key cryptosystem (PKC) (e.g., Pretty Good Privacy, or PGP), which requires two separate keys, one of which is secret while the other is public. The separate keys are linked to one another mathematically, and one key encrypts the plaintext into ciphertext while the other decrypts that ciphertext back into plaintext. As noted, one of the keys is public and the other key is kept private. In a PKC system, information encrypted with a recipient's public key cannot be decrypted except by a person or entity that possesses the matching private key. Representative cryptographic algorithms that implement such PKC schemes include, without limitation, RSA, Diffie-Hellman, and many others.

Referring now back to FIG. 6, the key 610 used to create the encrypted backup image 608 may be a symmetric key, or a member of an asymmetric key pair. In either case, however, preferably the key 610 is not provided "in the clear" to the service administrator 612 but, rather, is only available "in the clear" within the appliance 600. According to the technique of this disclosure, the administrator only has the key 610 in an encrypted form, as represented by reference numeral 614. In particular, key 614 preferably is generated by applying a public key (PK) 618 of a PKC key pair 616 to key 610. In other words, key 614 is generated as PK{key 610}, where PK represents the public key 618 of a PKC key pair that also includes private key 620. The private key 620 (sometimes referred to as the "manufacturer key") is maintained secret by the entity 604 and is unknown and unavailable to the administrator 614. As a result, the service administrator 612 does not obtain the key 610 directly (in the clear); rather, to the extent key 610 is available to the administrator, it is only in the form of key 614, which is the result of applying a cryptographic algorithm to key 610 (as the input) using the public key 618. Key 614 is generated by the manufacturer 604 or some entity (other than the administrator) on its behalf. Thus, key 610, which otherwise might be useful to restore the encrypted backup image, is not available to the administrator 612. Key 610, however, is available in the clear to internal systems and utilities within an appliance, including the backup and restore utility.

To distinguish key 610 from key 614, the key 614 provided to the administrator is sometimes referred to herein as a "value."

For illustrative purposes only, it is assumed that the appliance 600 is sourced from an entity, such as the manufacturer 604. More generally, entity 604 may be any entity distinct from the entity that is operating or managing the appliance 600.

Figure 7:
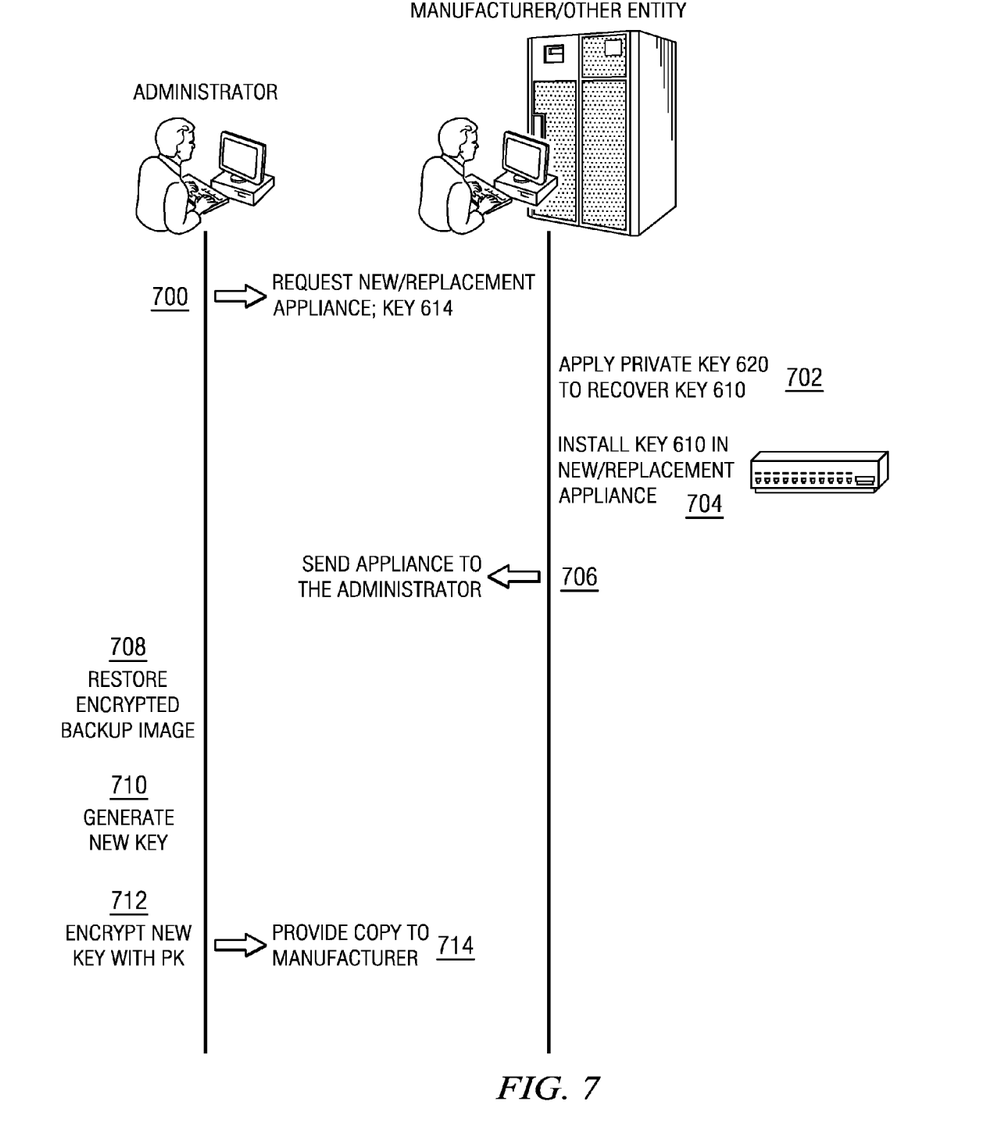
FIG. 7 illustrates how an administrator may interact with the appliance manufacturer to recover an encrypted backup image to a new appliance.

In the scenario shown, it is assumed that appliance 600 has generated one or more encrypted backup images 608 that are external to the appliance and thus are available to the administrator 612, but that appliance 600 has now failed in an unrecoverable manner. In an alternative scenario, it is desired to mirror an encrypted backup image on another appliance, such as appliance 602. In either circumstance, the service administrator 612 desires to stand up and configure a new appliance 602 using an encrypted backup image 608 that was originally created by the first appliance 600. In this scenario, appliance 602 may or may not be in possession of the administrator. In the usual case, the appliance 602 is available to the manufacturer 604 and will need to be configured; the administrator, however, desires to perform the restore of the encrypted backup image. According to this disclosure, the encrypted backup image from appliance 600 is restored to appliance 602 by the interactions that are illustrated in FIG. 7.

The process begins at step 700 with the administrator sending (typically to the manufacturer 604, or to some entity on its behalf) a request to obtain a new appliance. In the typical case, this request will be issued because, for example, appliance 600 has failed in an unrecoverable manner. This is not a limitation, however, as the request may be issued for other reasons (e.g., a desire to prove a backup appliance, to scale the system, or the like). The request is accompanied by key 614. At step 702, the manufacturer applies its private key 620 to the key 614 to recover the key 610. At step 704, the manufacturer installs the key 610 in the appliance 602 and, at step 706, the manufacturer forwards the appliance to the administrator. Of course, one or more intermediaries may be involved within these communication paths. Thus, steps 702 and 704 enable the manufacturer to restore the original key 610 to the new replacement appliance. At this point, however, because the new appliance has no customer data, the manufacturer does not gain access to any sensitive customer data (except perhaps the original key). Once the administrator receives the appliance 602, at step 708 he or she restores the encrypted backup image (e.g., by running the device's native backup and restore utility). The utility may be executed programmatically. Once the new replacement box 602 begins (i.e., resumes) operation using the restored backup image, the administrator may command the replacement box to execute an internal key generation algorithm to generate and save (internally within the new appliance 602) a key (or key pair) that will replace the key 610 going forward. This is step 710. At step 712, the new key is encrypted by the public key 618 and the resulting value maintained by the administrator 612. At step 714, a copy may also be returned to the manufacturer for safekeeping.

As one of ordinary skill in the art will appreciate, initially the appliance box only needs to have the manufacturer's public key, which is used to encrypt the key(s) used to encrypt/decrypt the backup image.

As noted above, the above-described technique may be implemented in use case scenarios other than an unrecoverable failure of the appliance that generates the encrypted backup image. Thus, more generally, the technique may be used in any scenario in which it is desired to restore to a second appliance an encrypted backup image generated on a first appliance, irrespective of the circumstances. In one alternative, the encrypted backup image is restored to an appliance that is already present in the operating domain for which the service administrator is responsible. In such case, a third party entity may be used to perform the steps 702 and 704, once again to ensure that the new machine is provisioned with the decryption key in a manner that does not expose that key (in the clear) to the administrator.

In another embodiment, the failure of the appliance 600 may be such that it can still be recovered from the encrypted backup image (although the key itself cannot be). In this scenario, the manufacturer may use its private key to recover the decryption key (in the manner previously described), which decryption key may then be provided to the administrator (e.g., using a secure transport mechanism, a digital signature scheme, or the like). The decryption key provided by the administrator is sometimes referred to herein as a "copy of the key." In this example scenario, the administrator then uses the decryption key directly to restore data from the encrypted backup image to the original appliance. This scenario does place the decryption key in the hands of the administrator "in the clear" and thus has to be used only where appropriate safeguards concerning the administrator can be assured.

The above-described subject matter provides many advantages. Except as described above, the service administrator need not have access to the decryption key necessary to decrypt an encrypted backup image. Thus, there is no possibility of the administrator obtaining a backup image (and thus accessing sensitive user data) outside of the appliance. The approach herein uses public key infrastructure (PKI) technology in the manner described to ensure the integrity and confidentiality of customer backup images, even in the event of a catastrophic failure of the appliance that generated those images. The technique ensures the integrity and confidentiality of the box and all user data at all times, thus ensuring customer privacy while not increasing (and, in fact, decreasing) user management complexity.

The approach works by maintaining the key necessary to decrypt encrypted backup images only in the appliance; any version of this key available external to the device is provided within an encryption that can only be removed by an entity that is authorized to do so.

While a preferred operating environment and use case (backup and restore of a cloud deployment appliance) has been described, as noted above, the techniques herein may be used in any other operating environment in which it is desired to restore data to another machine from an encrypted backup image while at the same time preventing a user executing the restore from having access (in the clear) to the backup image.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and backup and restore utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The particular cryptographic algorithms used within the PKI technology may be of any type.

Having described our invention, what we now claim is as follows:

1. Apparatus, comprising:
a processor;
computer memory holding computer program instructions that when executed by the processor perform a method of secure backup and restore, the method comprising:
storing a key, the key having associated therewith a value that has been generated by applying a public key of a public key pair to the key, wherein possessing the value does not expose the key;
encrypting data using the key to generate an encrypted backup image;
upon a given occurrence, receiving a copy of the key from an entity, the entity having generated the copy of the key upon receipt by the entity of the value; and
using the copy of the key to recover the encrypted backup image.

2. The apparatus as described in claim 1 wherein the encrypted backup image is recovered by applying the key to the encrypted backup image.

3. The apparatus as described in claim 1 wherein the given occurrence is a recoverable disk failure.

4. The apparatus as described in claim 1 wherein the copy of the key received from the entity is generated as a result of applying a private key of the public key pair to the value.

5. The apparatus as described in claim 1 wherein the method further includes:
generating a new key for use in encrypting data;
encrypting the new key with the public key to generate a new value;
maintaining the new key internally while providing the new value externally.

6. The apparatus as described in claim 5 wherein the method further includes providing the new value to the entity.

7. The apparatus as described in claim 1 wherein the key is associated with its own key pair.

8. A computer program product in a non-transitory computer readable medium for use in a data processing system, the computer program product holding computer program instructions which, when executed by the data processing system, perform a method of secure backup and restore, the method comprising:
storing a key, the key having associated therewith a value that has been generated by applying a public key of a public key pair to the key, wherein possessing the value does not expose the key;
encrypting data using the key to generate an encrypted backup image;
upon a given occurrence, receiving a copy of the key from an entity, the entity having generated the copy of the key upon receipt by the entity of the value; and
using the copy of the key to recover the encrypted backup image.

9. The computer program product as described in claim 8 wherein the encrypted backup image is recovered by applying the key to the encrypted backup image.

10. The computer program product as described in claim 8 wherein the given occurrence is a recoverable disk failure.

11. The computer program product as described in claim 8 wherein the copy of the key received from the entity was generated as a result of applying a private key of the public key pair to the value.

12. The computer program product as described in claim 8 wherein the method further includes:
generating a new key for use in encrypting data;
encrypting the new key with the public key to generate a new value;
maintaining the new key internally while providing the new value externally.

13. The computer program product as described in claim 12 wherein the method further includes providing the new value to the entity.

14. The computer program product as described in claim 8 wherein the key is associated with its own key pair.

15. An appliance, comprising:
a data store that stores data a key, the key having associated therewith a value that has been generated by applying a public key of a public key pair to the key, wherein possessing the value does not expose the key and the key is not available in a clear form externally;
a hardware processor;
computer memory holding instructions executed by the processor (i) to encrypt data using the key to generate an encrypted backup, and (ii) to receive a copy of the key from an entity upon a given occurrence, the entity having generated the copy of the key upon receipt by the entity of the value, and (iii) to use the copy of the key to recover the encrypted backup image.

16. Apparatus, comprising:
a processor;
computer memory, holding computer program instructions that when executed by the processor perform a method of secure backup and restore, the method comprising:
storing a key, the key having associated therewith a value that has been generated by applying a public key of a public key pair to the key, wherein possessing the value does not expose the key;
encrypting data using the key to generate an encrypted backup image;
upon a given occurrence, wherein the given occurrence is an unrecoverable disk failure, receiving a copy of the key from an entity, the entity having generated the copy of the key upon receipt by the entity of the value; and using the copy of the key to recover the encrypted backup image.

* * * * *